July 7, 1925.
W. H. B. PERRY
1,545,447
SAWING MECHANISM
Filed Dec. 14, 1921      4 Sheets-Sheet 3
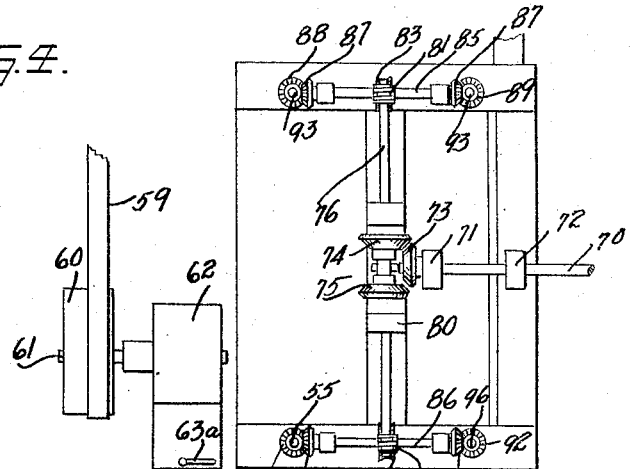
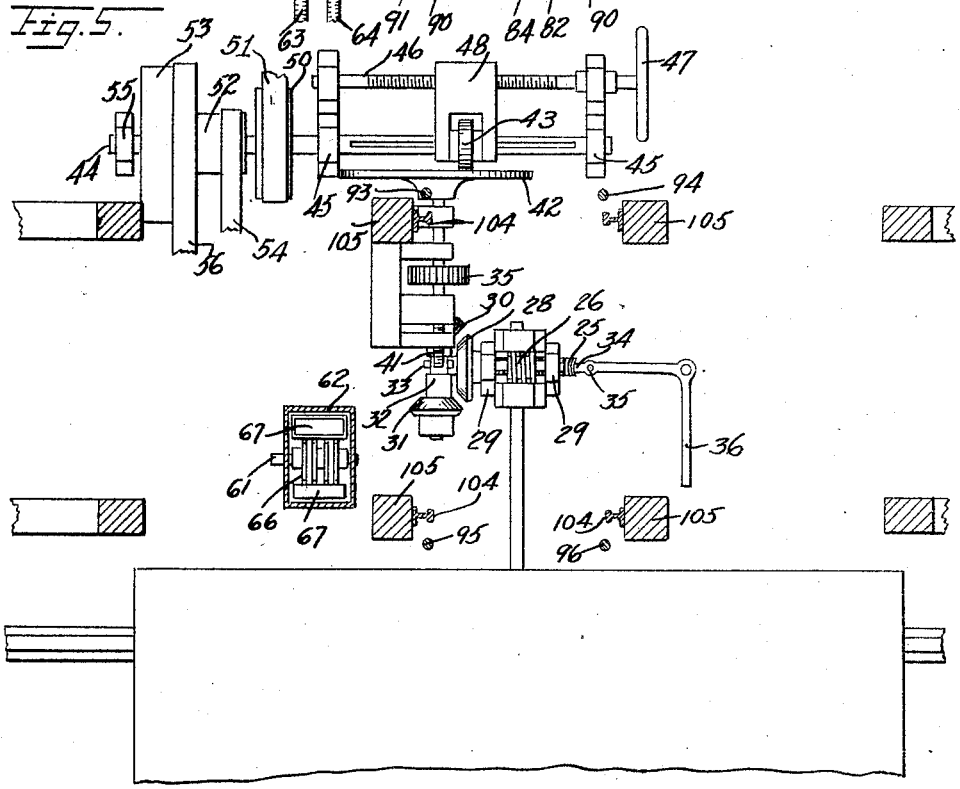
WITNESSES
H. J. Walker
W. Harrison
INVENTOR
W.H.B. PERRY
BY
ATTORNEYS

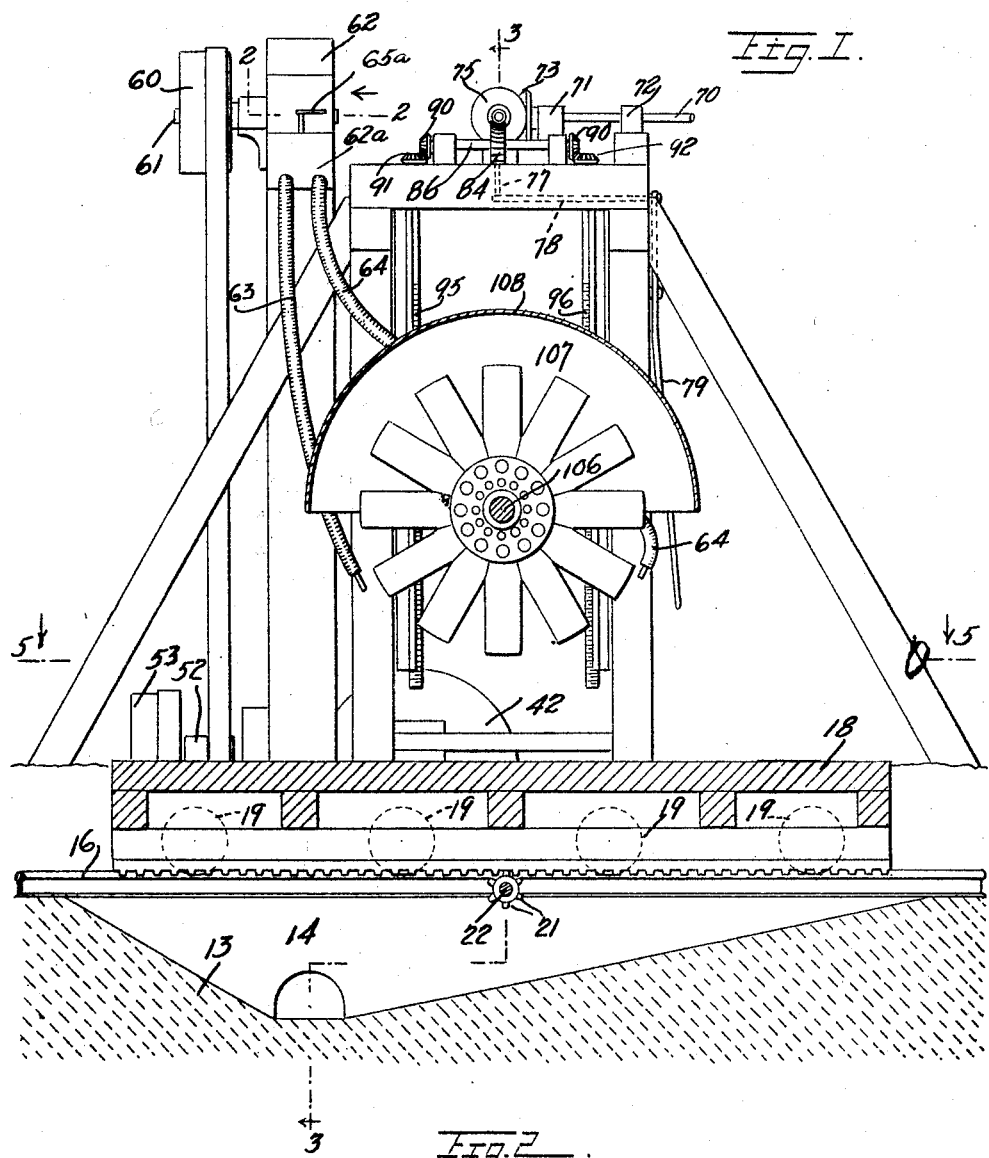
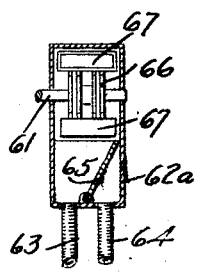

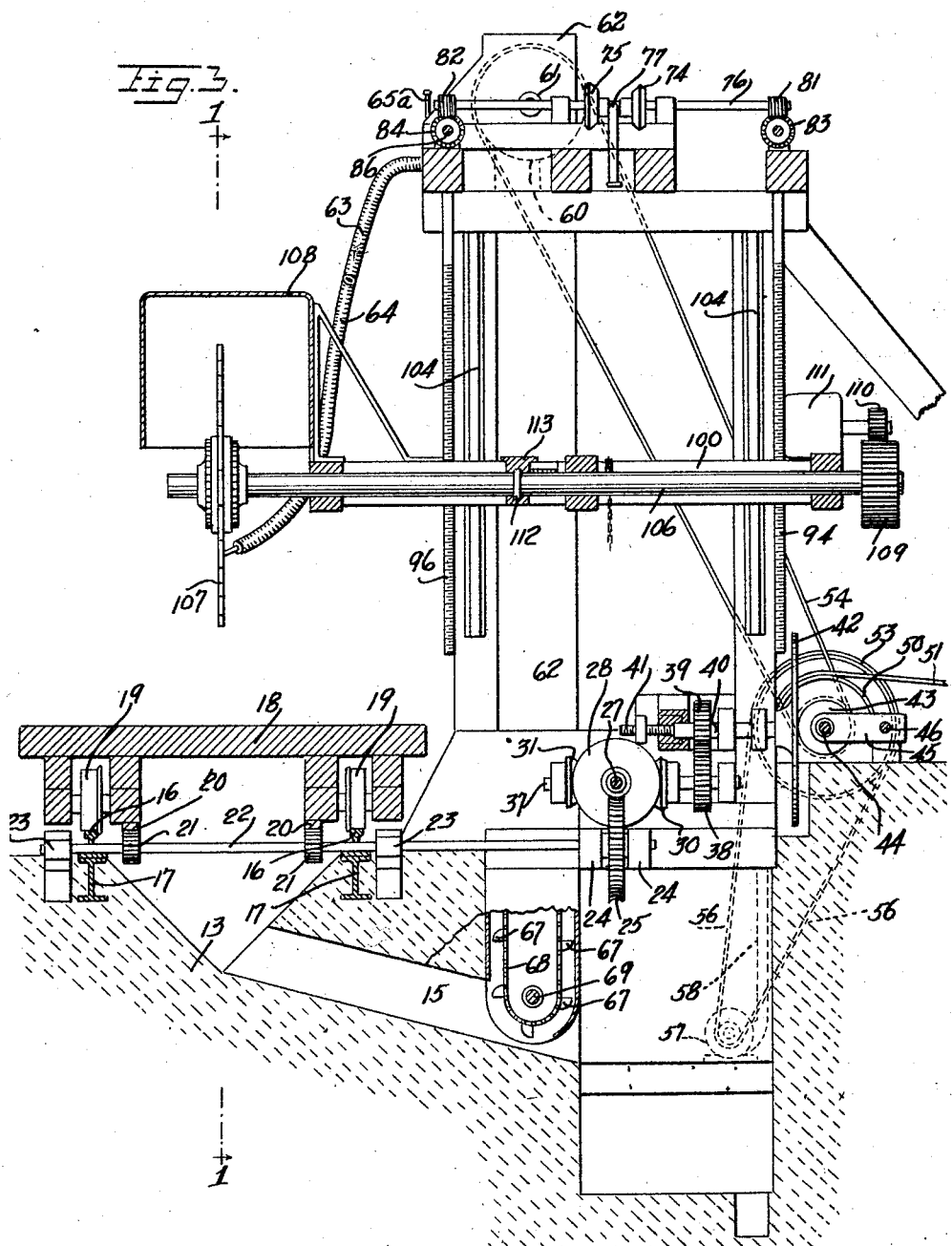

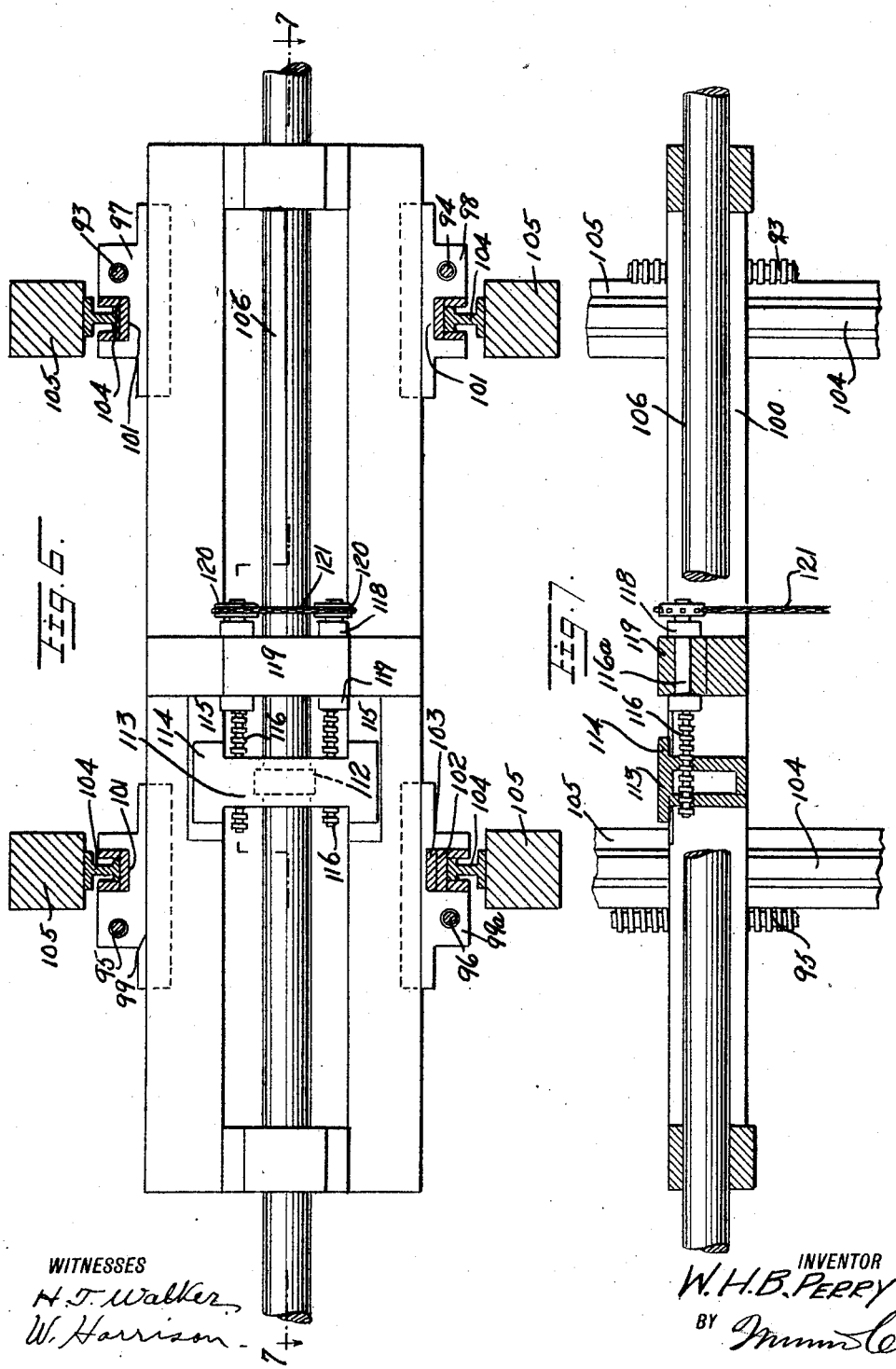

Patented July 7, 1925.

1,545,447

UNITED STATES PATENT OFFICE.

WILLIAM HENRY BENNETT PERRY, OF WATERBURY, VERMONT.

SAWING MECHANISM.

Application filed December 14, 1921. Serial No. 522,392.

*To all whom it may concern:*

Be it known that I, WILLIAM HENRY BENNETT PERRY, a citizen of the United States, and a resident of Waterbury, in the county of Washington and State of Vermont, have invented a new and Improved Sawing Mechanism, of which the following is a full, clear, and exact description.

My invention relates to sawing mechanisms, and more particularly to sawing mechanisms used for the purpose of sawing stone and other exceedingly hard materials, including granite, marble, and various kinds of stone.

My invention is adapted for use with a cutting material, such as chilled shot, sand, or abrasive of any suitable kind.

I seek to make a number of separate improvements upon different parts of the mechanism for the purpose of increasing the efficiency thereof and of increasing the quantity and quality of the work done by the mechanism as a whole.

My invention contemplates mechanism for accomplishing the following purposes, to wit:

I. To enable the operator to readily raise or lower the platform upon which the saw and its immediate connections are mounted.

II. To improve the reversing mechanism, used for reversing the direction of travel of the carriage carrying the stone to be cut.

III. To enable the operator to readily change the speed of the saw and of movable parts immediately associated therewith, without materially affecting the supply of power or the main gearing.

IV. To move the saw in a direction lateral to its general plane, so as to shift it from one part of the stone to be cut, to another part thereof, without shifting the position of the stone.

V. To simplify and improve the structure and action of various parts used throughout the machine generally.

VI. To so connect the main shaft carrying the saw with the motor used for driving the saw, and so shape the teeth of the saw as to enable the operator to cause the rotation of the saw in either of two directions.

VII. To so arrange the drive that the operator can reverse the direction of rotation of the saw whenever the stone to be cut is backed from the cutting edge of the saw.

Reference is made to the accompanying drawings forming a part of this specification, and in which like reference characters indicate like parts throughout all of the figures.

Figure 1 is a section on the line 1—1 of Figure 3, looking in the direction indicated by the arrows, and showing the circular saw and various parts associated therewith.

Figure 2 is a detail of the upper portion of the chute and is taken on the line 2—2 of Figure 1, looking in the direction indicated by the arrows.

Figure 3 is a section on the line 3—3 of Figure 1, looking in the direction indicated by the arrows.

Figure 4 is a fragmentary plan view of the upper portion of the machine, and shows a portion of the gearing used for raising and lowering the saw platform.

Figure 5 is a section on the line 5—5 of Figure 1, looking in the direction of the arrows, and showing a portion of the carriage reversing mechanism.

Figure 6 is a section on the line 6—6 of Figure 3, looking in the direction indicated by the arrows.

Figure 7 is a section on the line 7—7 of Figure 6.

A concrete foundation is shown at 13, and is provided with a passageway 14 and with a branch passage 15.

Supported by the foundation 13 are a pair of rails 16, which rest upon sills 17, the latter being embedded in the concrete foundation and extending practically flush with the upper surface thereof.

Resting upon the rails 16 is a carriage 18, used for supporting the stone and for moving the same back and forth relatively to the saw. This carriage is provided with wheels 19 which rest upon the rails 16. The carriage is further provided with a pair of long racks 20, which engage a pair of pinions 21, the latter being secured firmly upon a revoluble shaft 22 extending through bearings 23, 24, as may be understood from Figure 3. Secured rigidly upon the shaft 22 is a worm wheel 25, and engaging this worm wheel is a worm 26, carried by a worm shaft 27. Mounted upon the worm shaft 27 is a friction gear 28. The worm shaft extends through a bearing 29 whereby it is supported. Two other friction gears 30 and 31 are located in proximity to the friction gear 28, the friction gear 31 being mounted upon a sleeve 32. This sleeve is engaged by a fork 33, connected with an arm 34 having a projecting portion 36 serving as a handle, so that the operator by grasping portion 36 can cause the fork 33 to shift the sleeve 32 in either of two directions. By doing this, the operator can shift either friction gear 30 or 31 into engagement with the friction gear 28. The sleeve 32 is revolubly carried by a shaft 37, as may be seen more particularly in Figure 3. The shaft 37 carries a gear wheel 38 secured rigidly upon it and meshing with another gear wheel 39, the latter being carried by a shaft 40. The adjustment 41 is provided for the shaft 40, for the purpose of moving the shaft slightly in the direction of its length. The shaft 41 carries a friction disk 42 which engages a friction pinion 43. This friction pinion is splined upon a shaft 44, as may be seen from Figures 3 and 5. The shaft 44 is revolubly mounted in bearings 45. A screw 46 is journaled in these bearings, and extends through a nut 48 having the form of a massive block, as indicated in Figure 5, and serving as a guide for the friction pinion 43. Mounted rigidly upon the shaft 44 is a pulley 50 and engaging this pulley is a belt 51, by aid of which power is applied to the pulley 50 and shaft 44, so as to turn the friction pinion 43. A hand wheel 47 carried by the screw 46 is under control of the operator. By turning the hand wheel 47 in either of two directions, the friction pinion 43 is shifted bodily in relation to the center of the friction disk 42. By this arrangement the operator can change the speed of the friction disk 42 relative to that of the friction pinion 43. Mounted rigidly upon the shaft 44 are two other pulleys 52, 53. A belt 54 engages the pulley 52 and is used for transmitting power therefrom, as hereinafter described. A bearing 55, disposed adjacent one end of the shaft 44, is used for supporting the same. A belt 56 engages the pulley 53 and leads downwardly therefrom to a pump 57, this pump being used for removing water as it accumulates during the operation of the saw. A conduit 58 connected with the pump is used for conveying water upwardly during the operation of the pump.

The belt 54 leads upwardly and engages a pulley 60. This pulley is mounted upon a shaft 61, disposed adjacent the top of the machine and extending through a vertically disposed chute 62. This chute is provided with a distributing head 62ª, and connected with the latter are pipes 63, 64 leading downwardly and into proximity with the saw. A deflector 65, having the form of a gate, as shown more particularly in Figure 2, is located within the distributing head 62ª. Connected with the deflector 65 is a handle 65ª, shown more particularly in Figure 1. The operator by grasping this handle can shift the deflector in either of two directions, as indicated in Figure 2, so as to vertically close one of the pipes 63, 64, the other being thus left open.

The sprocket wheels of the conveyor appear at 66, the conveyor belts at 67, and at 68 are sprocket chains carrying the buckets, as may be understood from Figure 3. The part 69 is a conveyor pulley.

The conveyor is used for continuously raising the abrasive, which may consist of sand, chilled shot or comminuted abrasive of any kind. The pump 57 simply removes the water which is supplied from any convenient source.

By means of the mechanism shown in Figure 5, the operator can readily change the speed of the carriage 18, or change the direction of its travel.

I will next describe the mechanism used for raising and lowering the platform carrying the revoluble saw. A revoluble shaft 70 is mounted to turn in the bearings 71, 72 and carries a friction gear 73. Disposed adjacent this friction gear are two other friction gears 74, 75, which are splined upon a shaft 76 and movable in the direction of the length of this shaft by a fork 77 controllable at the will of the operator. For this purpose, the fork 77 is mounted upon a lever 78, and engaging this lever is another lever 79. The parts are so arranged that the operator, by grasping the lever 79 by hand and moving it in either of two directions, can shift the position of the fork 77 accordingly. The shaft 76 is journaled in bearings 80 and carries two worms 81, 82 secured rigidly upon it. These worms engage worm wheels 83, 84, the latter being secured firmly upon two shafts 85, 86. The shaft 85 carries two bevel gears 87, and the shaft 86 similarly carries two bevel gears 90. The bevel gears 87 engage two other bevel gears 88, 89 and the bevel gears 90 engage two bevel gears 91, 92. The bevel gears 88, 89 are mounted rigidly upon vertical shafts 93, 94, and the bevel gears 91, 92 are similarly mounted upon the upper ends of two shafts 95, 96. The four shafts 93, 94, 95, 96 are threaded externally, as may be understood from Figure 3, and are in effect merely screws of large size. Engaging these screws respectively are four nuts 97, 98, 99, 99ª, each having the form of a massive block and carried by a platform 100. The blocks 97, 98, 99, 99ª are provided with shoes 101, 102, the shoe 102 being fitted with a wedge 103 for purposes of adjustment. The shoes 101, 102 slidably engage rails 104, these rails being mounted upon beams 105 extending vertically, as may be understood from Figures 6 and 7. The saw shaft appears at 106 and is journaled upon the platform 100.

In order to raise or lower the platform 100, the operator grasps the hand lever 79, as above described, and by actuating it causes the fork 77 to rock, so as to bring either the friction gear 74 or the friction gear 75, as the case may be, into engagement with the friction gear 73. This done, power transmitted through the shaft 70 is conveyed to the four screws 93, 94, 95, 96, the direction of rotation of these screws being dependent upon the direction in which the fork 77 is shifted. The rotation of the four screws causes the saw platform to be raised or lowered, as the operator may desire. When the saw platform is moved to the level desired, the fork 77 is again shifted by aid of the hand lever 79 so as to disengage the friction gear 73 from the friction gears 74, 75.

The saw appears at 107, and is mounted upon the saw shaft 106. Disposed adjacent the saw is a saw shield 108 carried by the saw platform. The saw shaft 106 carries a gear wheel 109 which engages a small pinion 110, the latter being connected with and driven by a motor 111. This motor being carried by the saw platform, it is obvious that the saw can be effectively operated at any desired level within the limits of its travel.

In order to enable the operator to shift the saw in a direction lateral to the general plane of the saw, I provide the mechanism shown more particularly in Figures 6 and 7. My purpose in having the saw move thus in a direction lateral to its general plane is to shift the saw from one portion of the stone to another, so as to make different kerfs in the stone, without moving the stone sidewise. This is a point of great advantage, for the reason that the stone, especially if in the form of an ashlar, is exceedingly heavy and unwieldly. Moreover, the handling of the stone should be reduced to a minmum in order to avoid breakage of the stone or other accident.

In order to shift the saw for the purpose just indicated, I make special provision for shifting the position of the saw shaft, in the general direction of the length thereof, the mechanism for this purpose being shown in Figures 6 and 7. Mounted rigidly upon the saw shaft 106 is a swivel collar 112, and fitting upon this swivel collar is a block 113, having the form of a slide and provided with wings 114, the latter fitting against depressed faces 115 formed for this purpose. Extending through the block 113 are a pair of screws 116 having rather massive threads as shown, these parts being so fitted that by rotation of the screws 116 in one direction, the block 113 is moved to the right according to Figure 6, and by rotation of the screws in the opposite direction the block 113 is moved to the left according to this figure. The screws 116 are provided with collars 117, 118, and with smooth portions, one of which is shown at 116ª in Figure 7, extending through a cross beam 119, serving as a bearing. Mounted upon the screws 116 are sprocket wheels 120, and engaging these sprocket wheels is a sprocket chain 121. The operator by grasping this chain and pulling upon it so as to move it in the direction of its length, causes the sprockets 120 to rotate and turn the screws 116, the direction of rotation of the screws being determined by the direction in which the operator pulls the sprocket chain 121. Thus the operator is enabled to cause the block 113 to be shifted either to the right or to the left according to Figure 6, as desired. The block carries the shaft 106 with it, owing to the fact that the swivel collar 112 has a fixed working relation to the block 113. Thus it is an easy matter for the operator to shift the saw shaft, and by so doing to shift the position of the plane of the saw.

I do not limit myself to the precise mechanism here shown and described, as variations may be made therein without departing from the spirit of my invention.

Having thus described my invention, what I claim as new and desire to secure by Letters Patent is as follows:

1. A device of the character described comprising a framework provided with a top portion, a plurality of screws supported by said top portion and depending therefrom, gearing for turning said screws, mechanism controllable at the will of the operator for actuating said gearing, a platform supported upon said screws and movable either upward or downward depending upon the direction of rotation of said screws, a revoluble shaft carried by said platform, a cutter mounted upon said revoluble shaft and actuated thereby, a gear wheel mounted upon said shaft, a pinion disposed adjacent said gear wheel and engaging the same, said gear wheel having a sliding working relation to said pinion, a motor mounted upon said platform, and a shaft extending from said motor and connected with said pinion for the purpose of turning said pinion.

2. In a stone sawing mechanism, a vertically movable platform including spaced longitudinally extending side members, a cross beam extending between said side members intermediate the ends thereof, a block slidably mounted between said side members and relative to said cross beam, a cutter-carrying shaft supported by said frame and secured to said block, screw members carried by said cross beam and engaging said block and operable to move the latter longitudinally of said platform to impart a similar movement to said shaft, and means for operating said screw members.

3. In a stone sawing machine, a platform including longitudinal side members and a cross member intermediate the ends of the side members, a cutter-carrying shaft mounted on the platform and provided with a collar, a member slidable on the side members and engaging the collar, screw members mounted in the cross member of the platform and screwing into the slidable members, sprocket wheels on the screws, and a sprocket chain engaging the sprocket wheels.

4. In a stone sawing mechanism, a reciprocating carriage, a shaft for operating said carriage, mechanism for driving said shaft, a cutter movable with respect to said carriage, a vertically movable platform supporting said cutter, means for moving said cutter longitudinally of the platform and transversely relative to the movement of the carriage, means including an endless conveyor for transmitting an abrasive to said cutter, and means common to said shaft driving mechanism and endless conveyor for operating the same.

5. In a stone sawing machine, a frame work, four screws supported by the frame work and each having a gear wheel at its upper end, a platform supported on said screws, a driven shaft, a countershaft, gearing between the said shafts for rotating the countershaft in either direction, hand operated means for controlling said gearing, two shafts, each having at its ends gear wheels meshing with the gear wheels of two of the screws, and gearing between the counter shaft and each of said shafts.

6. A stone sawing machine, a reciprocating stone carrying carriage, means for reciprocating the carriage, a vertically movable platform, means for raising and lowering the platform, a shaft mounted in the platform to revolve and move endwise, a saw fixedly secured on the shaft, means for revolving the shaft, means for moving the shaft endwise, and means for supplying an abrasive to the cutter.

7. In a stone sawing machine, a vertically adjustable platform having spaced side members, and a cross member connecting the side members, a saw carrying shaft mounted in the platform and provided with a swiveled collar, a member engaging the collar and slidable on the side members of the platform, and means mounted in the cross members of the platform and operatively engaging the sliding member to slide it on the said side members and thereby move the shaft endwise.

WILLIAM HENRY BENNETT PERRY.